US010659743B2

(12) United States Patent
Arakawa et al.

(10) Patent No.: US 10,659,743 B2
(45) Date of Patent: May 19, 2020

(54) IMAGE PROJECTION DEVICE

(71) Applicants: QD LASER, INC., Kawasaki-shi (JP); THE UNIVERSITY OF TOKYO, Tokyo (JP)

(72) Inventors: Yasuhiko Arakawa, Tokyo (JP); Mitsuru Sugawara, Kawasaki (JP); Makoto Suzuki, Kawasaki (JP); Shuichi Tojo, Kawasaki (JP)

(73) Assignees: QD LASER, INC., Kawasaki-shi (JP); THE UNIVERSITY OF TOKYO, Tokyo (JP)

( * ) Notice: Subject to any disclaimer, the term of this patent is extended or adjusted under 35 U.S.C. 154(b) by 342 days.

(21) Appl. No.: 15/579,759

(22) PCT Filed: Apr. 26, 2016

(86) PCT No.: PCT/JP2016/063003
§ 371 (c)(1),
(2) Date: Dec. 5, 2017

(87) PCT Pub. No.: WO2016/208267
PCT Pub. Date: Dec. 29, 2016

(65) Prior Publication Data
US 2018/0184059 A1    Jun. 28, 2018

(30) Foreign Application Priority Data

Jun. 25, 2015   (JP) .................................. 2015-127869
Feb. 5, 2016    (JP) .................................. 2016-021013

(51) Int. Cl.
G02B 26/08      (2006.01)
H04N 9/31       (2006.01)
(Continued)

(52) U.S. Cl.
CPC ....... *H04N 9/3194* (2013.01); *G02B 26/0833* (2013.01); *G02B 26/101* (2013.01);
(Continued)

(58) Field of Classification Search
CPC .... H04N 9/3194; H04N 9/312; H04N 9/3135; G02B 26/101; G02B 27/108; G02B 27/0172; G02B 26/0833; G02B 2027/0178
(Continued)

(56) References Cited

U.S. PATENT DOCUMENTS 9,885,877 B2 *  2/2018  Yonekubo .......... G02B 27/4227
2006/0192094 A1  8/2006  Taniguchi
2016/0103324 A1  4/2016  Arakawa

FOREIGN PATENT DOCUMENTS

JP   2005-055793 A   3/2005
JP   2006-039271 A   2/2006
(Continued)

OTHER PUBLICATIONS

Office Action in counterpart Japanese Application No. 2016-021013 dated Aug. 1, 2017 (4 Sheets, 4 Sheets translation, 8 Sheets total).
(Continued)

Primary Examiner — Euncha P Cherry
(74) Attorney, Agent, or Firm — Kratz, Quintos & Hanson, LLP

(57) ABSTRACT

An image projection device includes: a first mirror oscillating to scan an image light beam forming an image projected onto a retina of a user; a light source emitting the image light beam and a detection light beam to the first mirror at different timings; a second mirror having a first region reflecting the image light beam reflected by the first mirror to the retina and a second region reflecting the detection light beam reflected by the first mirror in a direction different
(Continued)

from a direction in which the image light beam is reflected, and scanning neither the image light beam nor the detection light beam reflected by the first mirror; a detector detecting the detection light beam reflected by the second region; and a controller adjusting oscillation of the first mirror and an emission timing of the image light beam based on a detection result by the detector.

11 Claims, 14 Drawing Sheets

(51) Int. Cl.
    *G02B 27/01*     (2006.01)
    *G02B 27/10*     (2006.01)
    *G02B 26/10*     (2006.01)

(52) U.S. Cl.
    CPC ....... *G02B 27/0172* (2013.01); *G02B 27/108* (2013.01); *H04N 9/312* (2013.01); *H04N 9/3135* (2013.01); *G02B 2027/0178* (2013.01)

(58) Field of Classification Search
    USPC ...................................................... 359/205.1
    See application file for complete search history.

(56) References Cited

FOREIGN PATENT DOCUMENTS

| | | |
|---|---|---|
| JP | 2006-235274 A | 9/2006 |
| JP | 2008-089930 A | 4/2008 |
| JP | 2011-215397 A | 10/2011 |
| JP | 2012-118291 A | 6/2012 |
| JP | 2014-010409 A | 1/2014 |
| JP | 2015-111231 A | 6/2015 |

OTHER PUBLICATIONS

International Search Report for International Application No. PCT/JP2016/063003 dated Jul. 19, 2016.

\* cited by examiner

IMAGE PROJECTION DEVICE

TECHNICAL FIELD

The present invention relates to an image projection device, and, for example, to an image projection device that directly projects an image onto the retina of a user.

BACKGROUND ART

There have been known image projection devices that project an image by scanning a light beam emitted from a light source in the main scanning direction and the subscanning direction by a scan mirror. In such image projection devices, when the oscillation of the scan mirror and the emission timing of the light beam from the light source deviate from each other, the image quality deteriorates. Thus, a method of correcting the emission timing of the light beam from the light source has been suggested (e.g., see Patent Documents 1 and 2).

There have been also known image projection devices that directly project an image onto the retina of the user. Patent Document 1 directly projects an image onto the retina by scanning a light beam emitted from the light source by a scan mirror and projecting the scanned light onto the retina of the user. In Patent Document 1, the light beam extracted by a half mirror provided in the subsequent stage of the scan mirror is detected by a light detector, and the emission timing of the light beam from the light source is corrected based on the detection result to reduce the deterioration of the image quality.

PATENT DOCUMENT

Patent Document 1: Japanese Patent Application Publication No. 2011-215397
Patent Document 2: Japanese Patent Application Publication No. 2014-10409

SUMMARY OF THE INVENTION

Problem to be Solved by the Invention

The image projection device that directly projects an image onto the retina of the user is preferably small because it is mounted to, for example, the body (face) of the user. However, in Patent Document 1, since the half mirror or the like is provided in the subsequent stage of the scan mirror, the device size increases.

The present invention has been made in view of the above problems, and aims to provide an image projection device that reduces deterioration of image quality and increase in device size.

Means for Solving the Problem

The present invention is an image projection device characterized by including: a first mirror that oscillates in a main scanning direction beyond a range of an image projected onto a retina of a user to scan an image light beam in the main scanning direction, the image light beam forming the image; a light source that emits the image light beam to the first mirror in a period corresponding to the range of the image and emits a detection light beam to the first mirror at time corresponding to an outside of the range of the image in reciprocal oscillation in the main scanning direction of the first mirror; a second mirror that reflects the image light beam reflected by the first mirror to the retina of the user, and reflects the detection light beam reflected by the first mirror in a direction different from a direction in which the image light beam is reflected or transmits the detection light beam; a light detector that detects the detection light beam reflected by the second mirror or the detection light beam passing through the second mirror; and a controller that adjusts oscillation of the first mirror and an emission timing of the image light beam from the light source based on a detection result by the light detector.

In the above configuration, the light source may emit the detection light beam within a period shorter than a period from an end of the range of the image to a turn-round of oscillation in the main scanning direction of the first mirror without making the detection light beam temporally continuous with the image light beam.

In the above configuration, the controller may adjust the oscillation of the first mirror and the emission timing of the image light beam so that a light intensity of the detection light beam detected by the light detector increases.

In the above configuration, the light source may emit the detection light beam in each of a going path and a return path of the reciprocal oscillation of the first mirror without making the detection light beam in the going path and the detection light beam in the return path temporally continuous with each other, and the controller may adjust the oscillation of the first mirror and the emission timing of the image light beam based on a detection result of the detection light beam emitted in the going path and a detection result of the detection light beam emitted in the return path.

In the above configuration, the light source may emit the detection light beam at each side of the range of the image, and the controller may adjust the oscillation of the first mirror and the emission timing of the image light beam based on a detection result of the detection light beam emitted at the each side of the range of the image.

In the above configuration, the second mirror may have a first region that reflects the image light beam and a second region that reflects the detection light beam in a direction different from a direction in which the image light beam is reflected, the light detector may detect the detection light beam reflected by the second mirror, and in the second mirror, the second region may be located next to the first region in a direction corresponding to the main scanning direction, and may protrude or may be recessed with respect to the first region.

In the above configuration, the second region of the second mirror may have a reflecting surface having a dimension not greater than a width of the detection light beam in the direction corresponding to the main scanning direction.

In the above configuration, the light detector may detect the detection light beam passing through the second mirror, and has a light receiving region not larger than a width of the detection light beam.

In the above configuration, the first mirror and the second mirror may be provided to a spectacle type frame, and the light detector may be provided to an external device different from the spectacle type frame.

In the above configuration, the first mirror, the second mirror, and the light detector may be provided to a spectacle type frame.

Effects of the Invention

The present invention can reduce deterioration of image quality and inhibit increase in device size.

EMBODIMENTS FOR CARRYING OUT THE INVENTION

Hereinafter, with reference to drawings, embodiments of the present invention will be described.

First Embodiment

Figure 1:
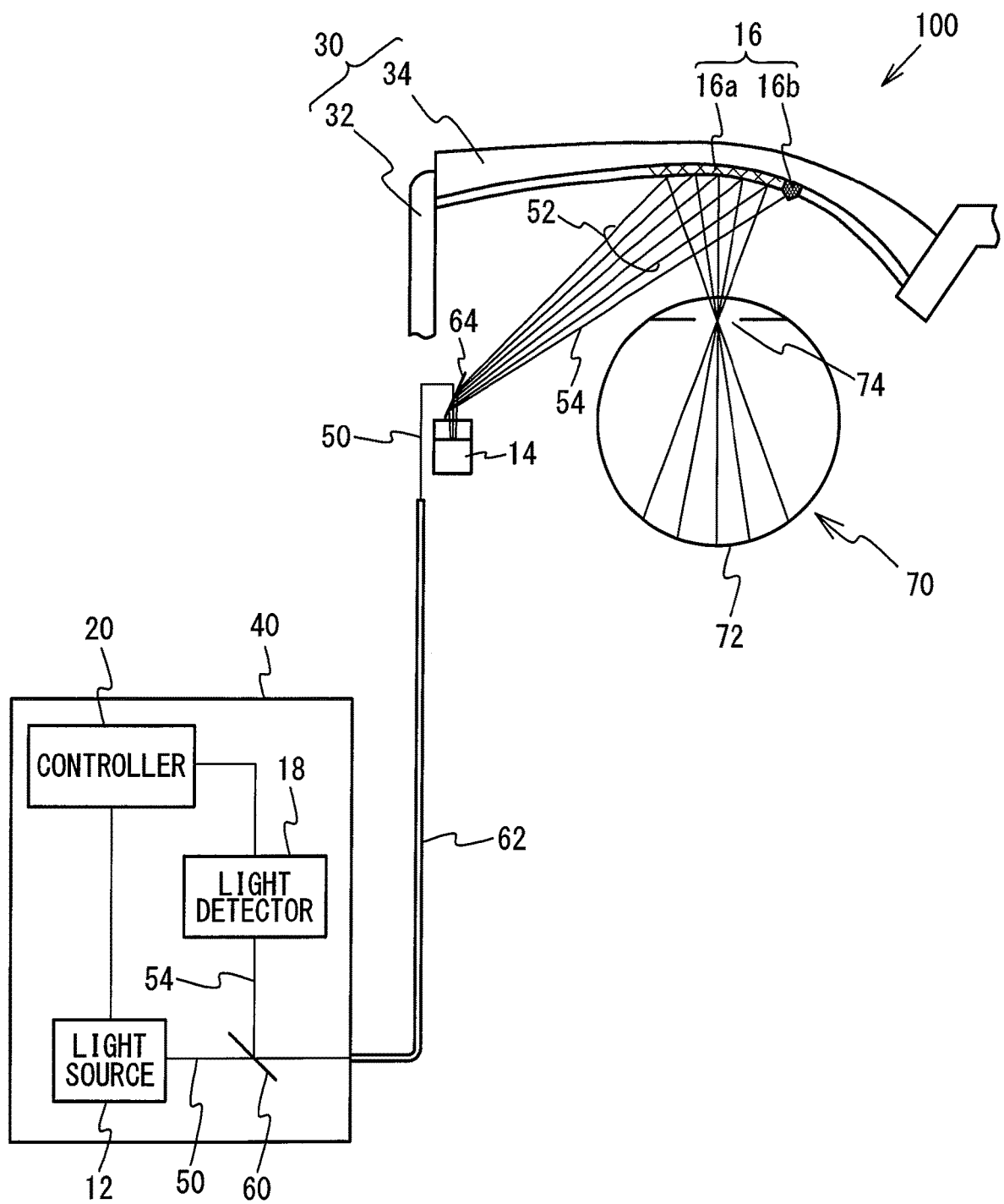
FIG. 1 illustrates an image projection device in accordance with a first embodiment as viewed from above.

FIG. 1 illustrates an image projection device 100 in accordance with a first embodiment as viewed from above. In FIG. 1, a light beam 50 (including an image light beam 52 and a detection light beam 54) represents the central portion of a light beam having a finite luminous flux diameter. The image projection device 100 of the first embodiment is a retina-projection type head-mounted display using Maxwellian view in which the image light beam for causing the user to visually recognize an image is directly projected onto a retina 72 of an eye ball 70 of the user. The image projection device 100 of the first embodiment includes a light source 12, a first mirror 14, a second mirror 16, a light detector 18, and a controller 20 as illustrated in FIG. 1. The first mirror 14 and the second mirror 16 are located in a spectacle type frame 30. The light source 12, the light detector 18, and the controller 20 are included in an external device 40 such as, for example, a mobile terminal.

The light source 12 emits a light beam 50 of a single wavelength or a plurality of wavelengths under the instruction of the controller 20. The light beam 50 includes the image light beam 52 for projecting an image onto the retina 72 of the user and the detection light beam 54 for detecting the emission timing of the image light beam 52 with respect to the oscillation of the first mirror 14. That is, the controller 20 causes the light source 12 to emit the image light beam 52 based on input image data, and causes the light source 12 to emit the detection light beam 54 for detecting the emission timing of the image light beam 52 with respect to the oscillation of the first mirror 14.

The light source 12 emits, for example, a red laser light (wavelength: approximately 610 nm to 660 nm), a green laser light (wavelength: approximately 515 nm to 540 nm), and a blue laser light (wavelength: approximately 440 nm to 480 nm). Non-limiting examples of the light source 12 emitting red, green, and blue laser lights include a light source in which, for example, respective laser diode chips for RGB (red/blue/green), a three-color synthesis device, and a micro collimating lens are integrated.

The first mirror 14 is located in a temple 32 of the spectacle type frame 30. The light beam 50, which is emitted from the light source 12 and goes through a half mirror 60, an optical fiber 62, a lens and a mirror, which are not illustrated, and the like, enters the first mirror 14. The first mirror 14 reflects the image light beam 52 emitted from the light source 12, and scans the image light beam 52 in the main scanning direction and the subscanning direction. The first mirror 14 both-way scans the image light beam 52 in the main scanning direction, and one-way scans the image light beam 52 in the subscanning direction, for example. The main scanning direction and the subscanning direction are directions perpendicular to each other, and the main scanning direction is a horizontal direction, while the subscanning direction is a vertical direction. Additionally, the first mirror 14 reflects the detection light beam 54 emitted from the light source 12. The first mirror 14 is, for example, a micro electro mechanical system (MEMS) mirror.

The image light beam 52 and the detection light beam 54 reflected by the first mirror 14 are reflected by a mirror 64 toward a lens 34 of the spectacle type frame 30. The second mirror 16 is located on a surface at the eye ball 70 side of the lens 34 of the spectacle type frame 30. Thus, the image light beam 52 and the detection light beam 54 reflected by the mirror 64 enter the second mirror 16. The second mirror 16 is a half mirror having a free curved surface or a composite structure of a free curved surface and a diffraction surface in a first region 16a where the image light beam 52 is incident. Thus, the image light beam 52 entering the second mirror 16 converges near a pupil 74 of the eye ball 70 of the user, and then is projected onto the retina 72. This allows the user to visually recognize the image by the image light beam 52 and visually recognize an external world image through the lens 34.

On the other hand, the second mirror 16 is a half mirror having a shape protruding with respect to the first region 16a in a second region 16b where the detection light beam 54 is incident. Thus, the detection light beam 54 entering the second mirror 16 is reflected in a direction different from the direction in which the image light beam 52 is reflected. For example, the detection light beam 54 is reflected by the second mirror 16 so that the detection light beam 54 travels back along a light path that is the same as the light path along which the detection light beam 54 traveled toward the second mirror 16. The protruding shape of the second region 16b is minute, thus hardly affecting the vision of the user.

The detection light beam 54 reflected by the second mirror 16 is reflected by the mirror 64 and the first mirror 14, then goes through the optical fiber 62, and is split by the half mirror 60. The split detection light beam 54 enters the light detector 18. Accordingly, the light detector 18 can detect the detection light beam 54 reflected by the second mirror 16. The detection result by the light detector 18 is output to the controller 20. The light detector 18 is, for example, a photodetector. The light detector 18 detects the detection light beam 54 at a time constant, for example, equal to or greater than the period of the reciprocal oscillation in the main scanning direction of the first mirror 14.

In the second mirror 16, the second region 16b is located next to the first region 16a in the direction corresponding to the main scanning direction. Additionally, the second region 16b is formed so as to have a reflecting surface narrower than the width of the detection light beam 54 incident to the second region 16b in the direction corresponding to the main scanning direction. For example, the second region 16b is formed so as to have a reflecting surface having dimensions approximately equal to one pixel or several pixels of the image projected onto the retina 72 in the direction corresponding to the main scanning direction.

Figure 2:
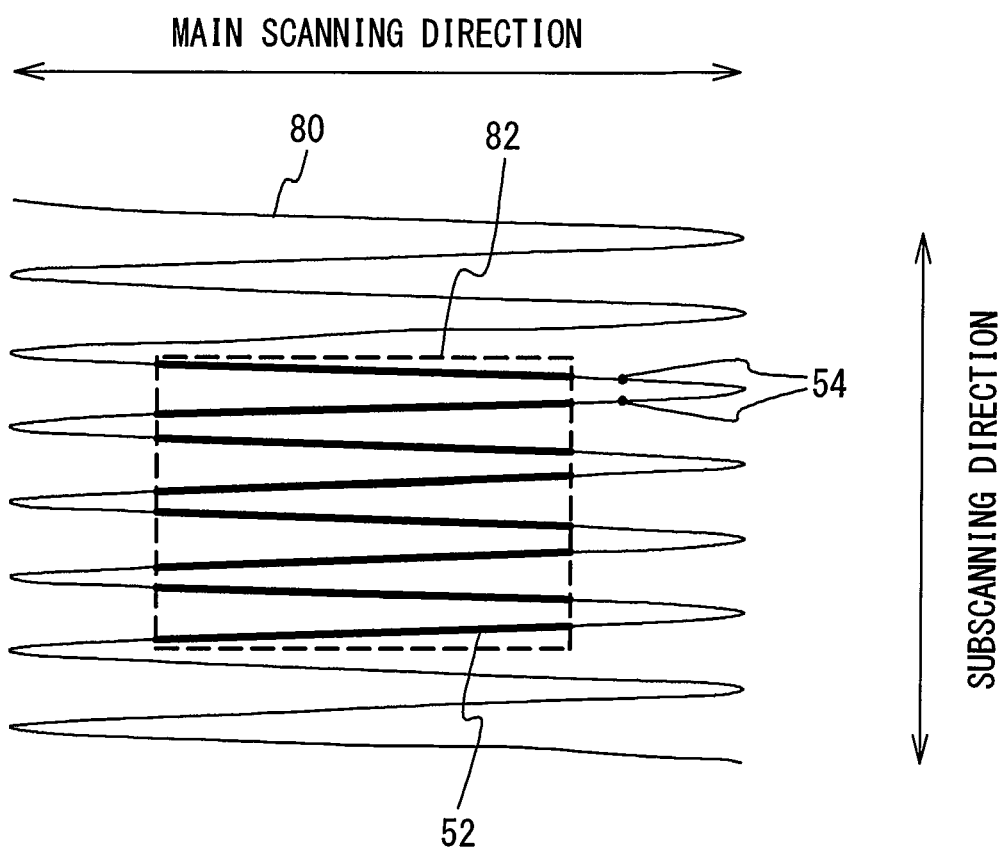
FIG. 2 is a diagram for describing emission timings of an image light beam and a detection light beam with respect to the oscillation of a first mirror.

Here, the image light beam 52 and the detection light beam 54 will be described in detail. FIG. 2 is a diagram for describing emission timings of the image light beam 52 and the detection light beam 54 with respect to the oscillation of the first mirror 14. In FIG. 2, the oscillation of the first mirror 14 is indicated by reference numeral 80. As illustrated in FIG. 2, the first mirror 14 oscillates in the main scanning direction and the subscanning direction beyond an image range 82 projected onto the retina 72. The light source 12 emits the image light beam 52 for a period during which the oscillation of the first mirror 14 is in the image range 82 in both the going path and the return path of the reciprocal oscillation in the main scanning direction of the first mirror 14. This configuration causes the image light beam 52 to be scanned by the first mirror 14. The reason why the image light beam 52 is scanned in the range within which the oscillation angle of the first mirror 14 is small is because the distortion of the projected image is large if the image is projected onto the retina 72 by scanning the image light beam 52 in the range within which the oscillation angle of the first mirror 14 is large. The image light beam 52 may not be necessarily scanned in a rectangular shape, and may be scanned in other shapes such as a trapezoidal shape.

In the reciprocal oscillation in the main scanning direction of the first mirror 14, at the time (timing) when the oscillation of the first mirror 14 is outside the image range 82, the light source 12 emits the detection light beam 54 having a predetermined light intensity. The detection light beam 54 is emitted from the light source 12 in each of the going path and the return path of the reciprocal oscillation of the first mirror 14. The detection light beam 54 may be a light beam of a single wavelength. It is only required that the detection light beam 54 has a light intensity enough to be detected by the light detector 18, and the light intensity may be constant.

Figure 3:
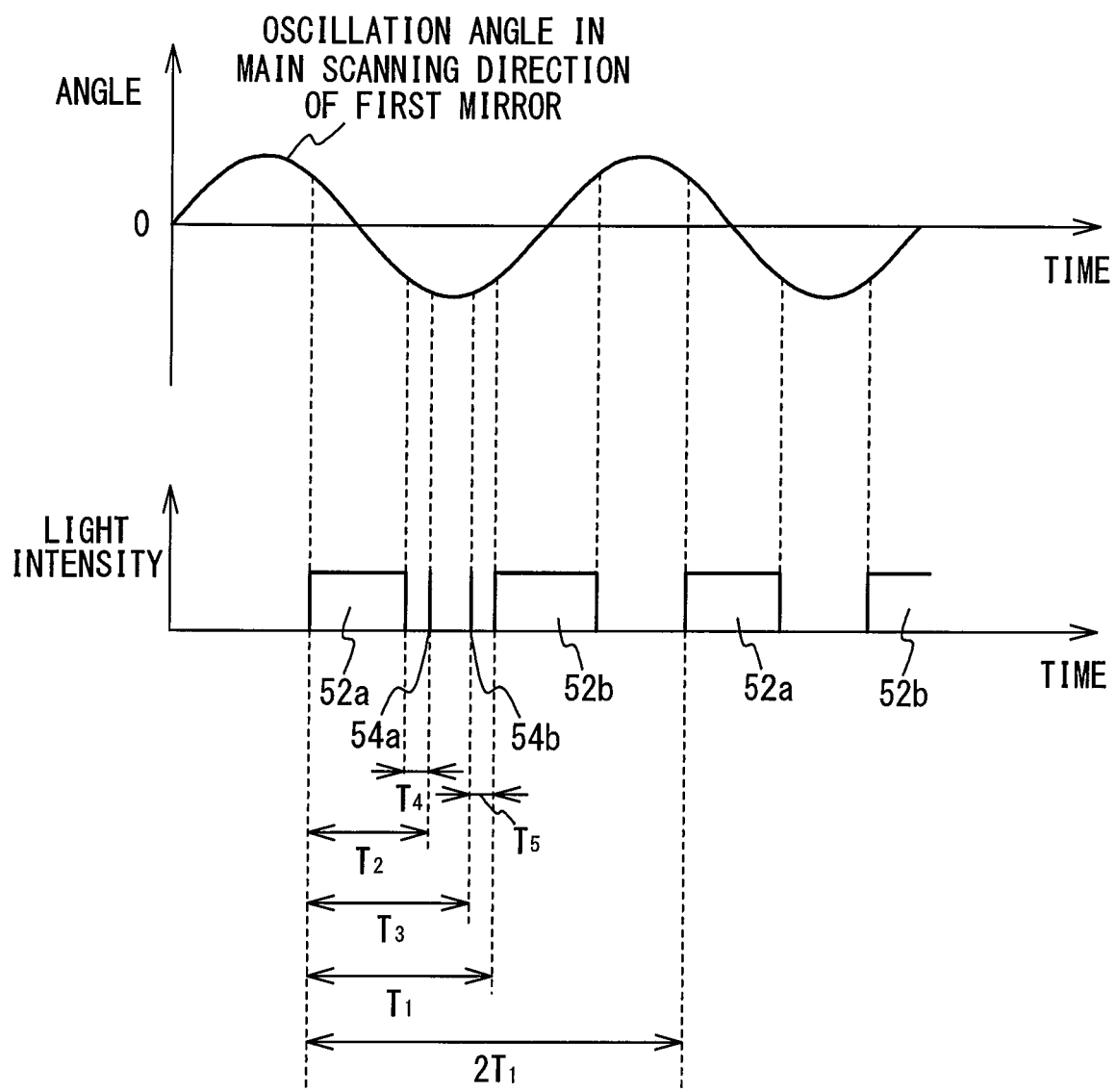
FIG. 3 is a timing chart illustrating emission timings of the image light beam and the detection light beam with respect to the oscillation of the first mirror.

FIG. 3 is a timing chart illustrating emission timings of the image light beam 52 and the detection light beam 54 with respect to the oscillation of the first mirror 14. As illustrated in FIG. 3, the timing when the emission of the image light beam 52 to be scanned first in the image range 82 (here, an image light beam 52a in the going path of the reciprocal oscillation of the first mirror 14) is started is determined by using the oscillation angle in the main scanning direction of the first mirror 14 as a reference. The oscillation angle in the main scanning direction of the first mirror 14 can be detected by a sensor not illustrated.

After the emission of the image light beam 52a, of which the emission has been started at the timing determined by using the oscillation angle of the first mirror 14 as a reference, ends, an image light beam 52b in the return path of the reciprocal oscillation of the first mirror 14 and the image light beam 52a in the going path are repeatedly emitted. These image light beams 52a and 52b are repeatedly emitted based on an elapsed time from the start of the emission of the image light beam 52a of which the emission has been started with reference to the oscillation angle of the first mirror 14. That is, after a predetermined time $T_1$ elapses from the start of the emission of the image light beam 52a of which the emission has started with reference to the oscillation angle of the first mirror 14, the emission of the image light beam 52b in the return path is started, and after another predetermined time $T_1$ passes, the emission of the image light beam 52a in the going path is started. The operations described above are repeated until the image of one frame is formed. For example, an interval $2T_1$ at which the image light beam 52a in the going path is emitted is approximately 35 µsec.

A detection light beam 54a in the going path of the reciprocal oscillation of the first mirror 14 and a detection light beam 54b in the return path are emitted from the light source 12 singly between the emissions of the image light beams 52a and 52b. The detection light beam 54a in the going path is emitted singly after a predetermined time $T_2$ elapses from the start of the emission of the image light beam 52a of which the emission has been started with reference to the oscillation angle of the first mirror 14. The detection light beam 54b in the return path is emitted singly after a predetermined time $T_3$ elapses from the start of the emission of the image light beam 52a of which the emission has started with reference to the oscillation angle of the first mirror 14. That is, the light source 12 emits each of the detection light beams 54a and 54b within the period shorter than the period from the end of the image range 82 to the turn-round of the oscillation in the main scanning direction of the first mirror 14 without making the detection light beams 54a and 54b temporally continuous with the image light beams 52a and 52b. The light source 12 emits the detection light beam 54a in the going path and the detection light beam 54b in the return path without making them temporally continuous with each other. A time interval $T_4$ between the image light beam 52a and the detection light beam 54a is set equal to a time interval $T_5$ between the image light beam 52b and the detection light beam 54b. Thus, the detection light beams 54 are set so that the detection light beams 54 are positioned in the same line in the subscanning direction as illustrated in FIG. 2. The time intervals $T_4$ and $T_5$ are, for example, approximately 1 µsec.

As described above, the emission of the image light beam 52 is started based on the oscillation angle of the first mirror 14, and the image light beam 52 and the detection light beam 54 thereafter are emitted from the light source 12 at the predetermined constant timings.

Figure 4A:
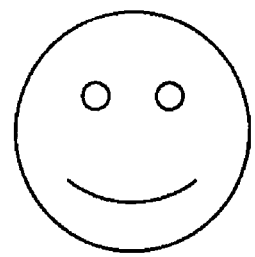
FIG. 4A and FIG. 4B illustrate examples of an image projected onto a retina.
Figure 4B:
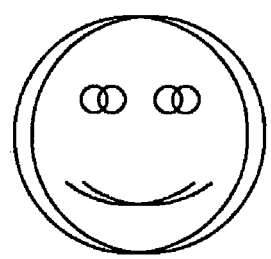

Here, when there is no shift in relative projection position between the image light beam 52a in the going path and the image light beam 52b in the return path in the reciprocation scanning in the main scanning direction, an image with good image quality is projected onto the retina 72 as illustrated in FIG. 4A. However, physical properties of the light source 12 and the first mirror 14, an electric circuit, or the like may change depending on temperature and the lapse of time. In this case, a shift in relative projection position between the image light beam 52a in the going path and the image light beam 52b in the return path occurs, and thereby the image projected onto the retina 72 may be seen double as illustrated in FIG. 4B.

To inhibit such deterioration of image quality, in the first embodiment, the detection light beam 54 reflected by the second mirror 16 is detected by the light detector 18, and the controller 20 adjusts the emission timing of the image light beam 52 based on the detection result by the light detector 18. A processor such as a central processing unit (CPU) and memories such as a random access memory (RAM) and a read only memory (ROM) function as the controller 20. The processor functions as the controller 20 according to the program stored in the memory.

Figure 5:
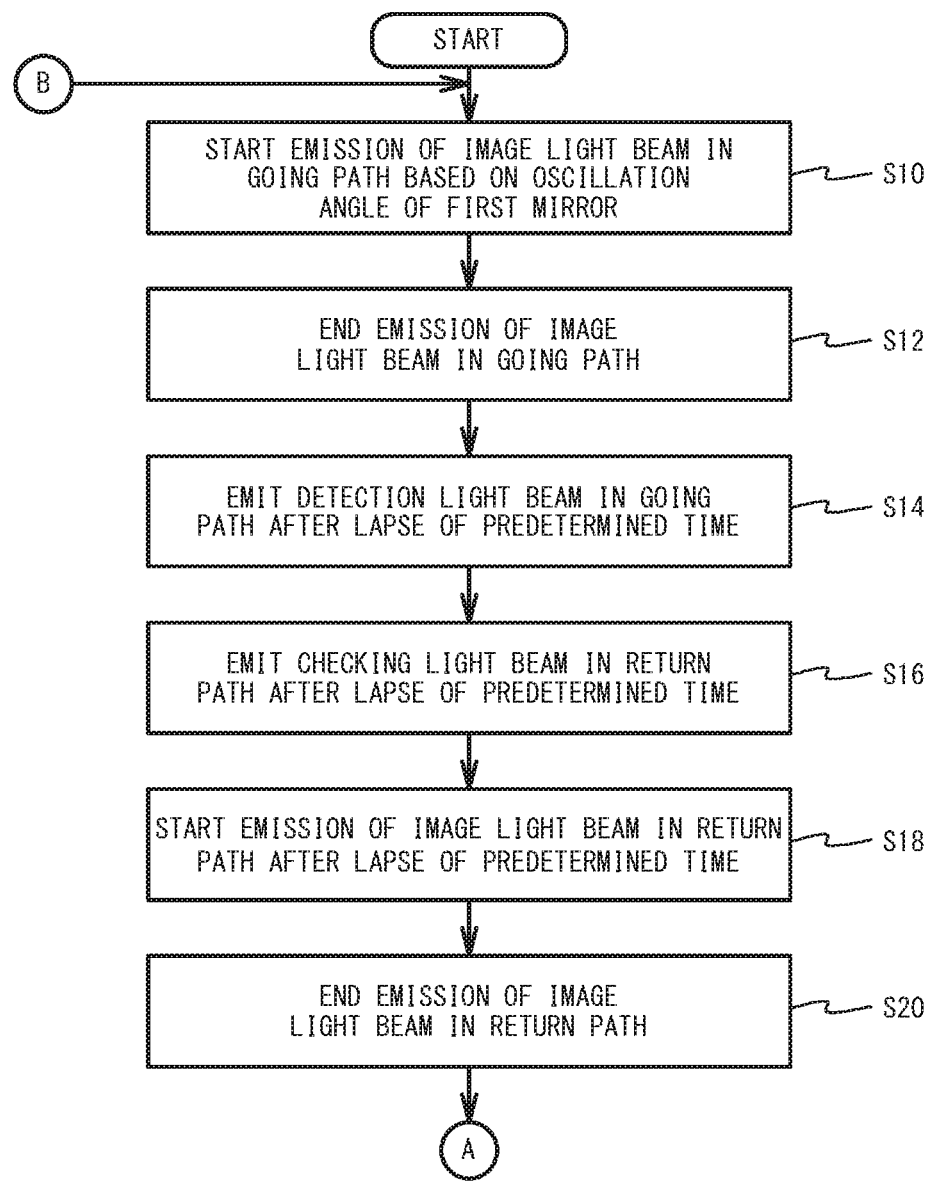
FIG. 5 is a flowchart (No. 1) of an exemplary process executed by the controller of the image projection device of the first embodiment.
Figure 6:
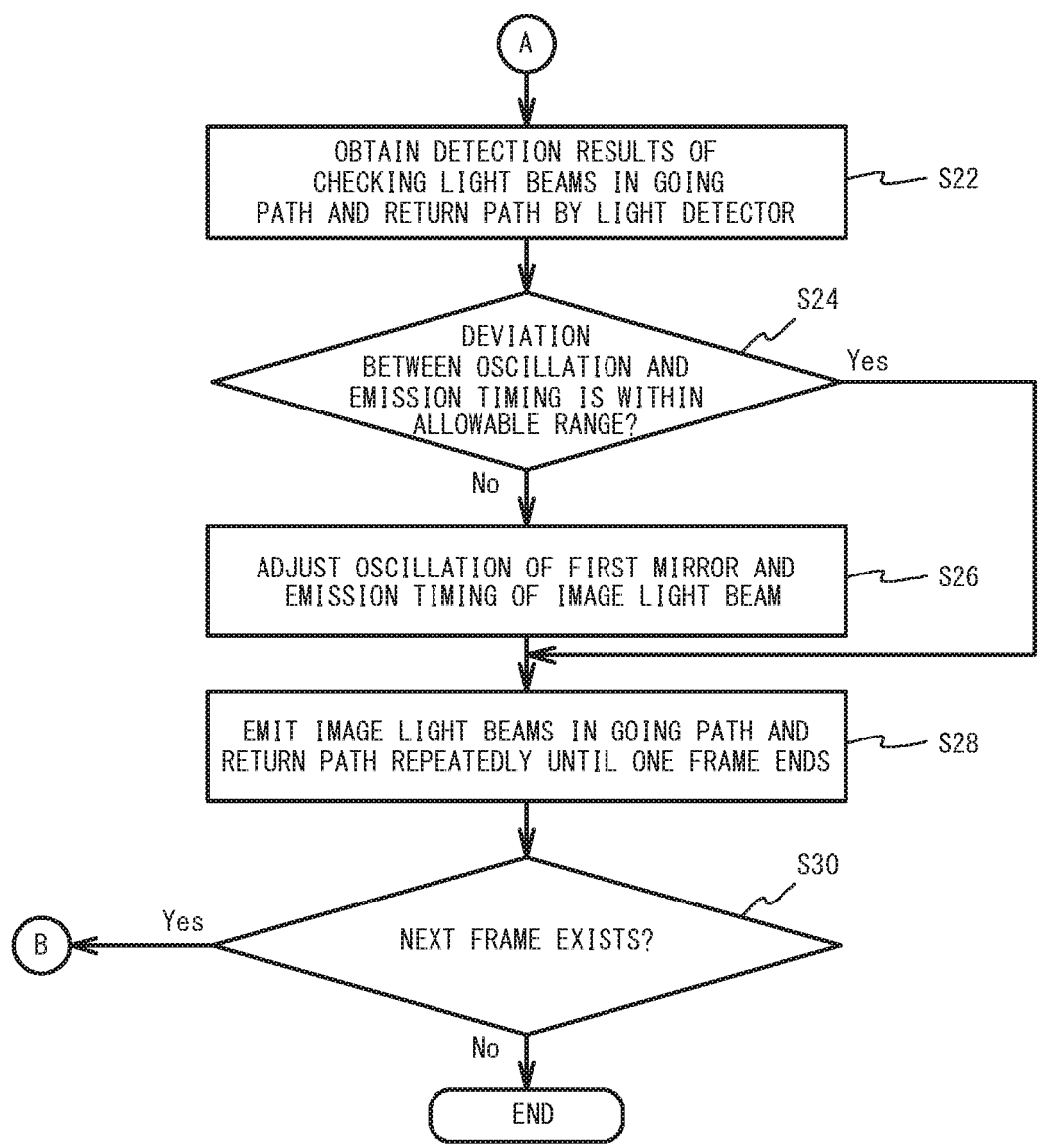
FIG. 6 is a flowchart (No. 2) of the exemplary process executed by the controller of the image projection device of the first embodiment.

FIG. 5 and FIG. 6 are flowcharts of exemplary processes by the controller 20 of the image projection device 100 of the first embodiment. As illustrated in FIG. 5, at step S10, the controller 20 causes the light source 12 to start the emission of the image light beam 52a in the going path based on the oscillation angle in the main scanning direction of the first mirror 14. Then, at step S12, the controller 20 ends the emission of the image light beam 52a after a predetermined emission time elapses.

Then, at step S14, the controller 20 causes the light source 12 to emit the detection light beam 54a in the going path after a predetermined time ($T_2$) elapses from the emission start timing at which the emission of the image light beam 52a has been started based on the oscillation angle of the first mirror 14. Then, at step S16, the controller 20 causes the light source 12 to emit the detection light beam 54b in the return path after a predetermined time ($T_3$) elapses from the emission start timing at which the emission of the image light beam 52a has been started based on the oscillation angle of the first mirror 14.

Then, at step S18, the controller 20 causes the light source 12 to start the emission of the image light beam 52b in the return path after a predetermined time ($T_1$) elapses from the emission start timing at which the emission of the image light beam 52a has been started based on the oscillation angle of the first mirror 14. Then, at step S20, the controller 20 ends the emission of the image light beam 52b after a predetermined emission time elapses.

Then, at step S22 in FIG. 6, the controller 20 obtains the detection results of the detection light beams 54a and 54b reflected by the second mirror 16 by the light detector 18. For example, the controller 20 obtains the light intensities of the detection light beams 54a and 54b detected by the light detector 18 for a predetermined period (for example, the period equal to or greater than the period of the reciprocal oscillation in the main scanning direction of the first mirror). In this case, the controller 20 can start the detection by the light detector 18 before step S10 in FIG. 5 and end the detection by the light detector 18 after step S20. The controller 20 can obtain the sum of the values of integral of the light intensities of the detection light beams 54a and 54b in the predetermined period by obtaining the light intensities of the detection light beams 54a and 54b detected by the light detector 18 for the predetermined period. The controller 20 stores the obtained sum of the values of integral of the light intensities in a storage unit not illustrated.

Then, at step S24, the controller 20 determines whether a deviation beyond an allowable range occurs between the oscillation in the main scanning direction of the first mirror 14 and the emission timings of the image light beams 52a and 52b based on the detection results of the detection light beams 54a and 54b by the light detector 18.

Figure 7A:
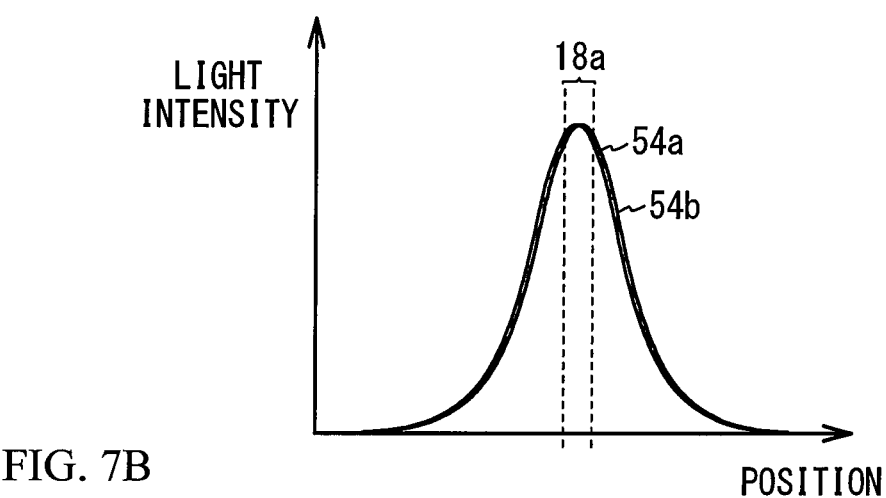
FIG. 7A and FIG. 7B are diagrams for describing the detection of the detection light beam by a light detector.
Figure 7B:
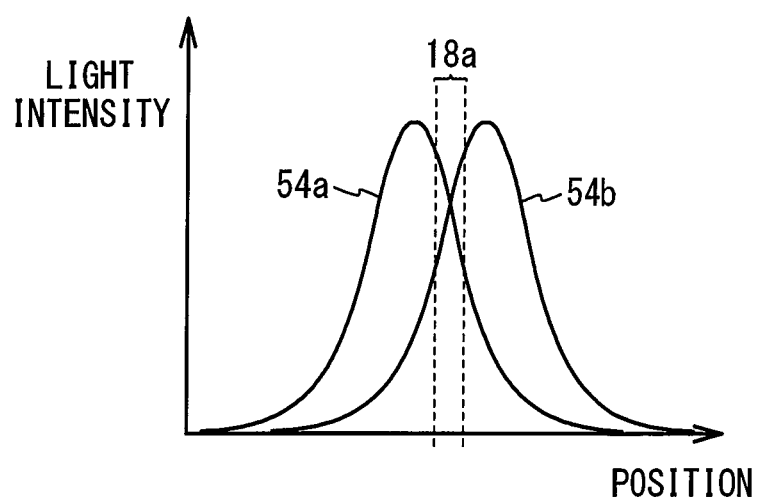

Here, the deviation between the oscillation of the first mirror 14 and the emission timings of the image light beams 52a and 52b will be described with FIG. 7A and FIG. 7B. FIG. 7A and FIG. 7B are diagrams for describing the detection of the detection light beams 54a and 54b by the light detector 18. In each of FIG. 7A and FIG. 7B, the horizontal axis represents the position in the second mirror 16 in the direction corresponding to the main scanning direction, and the vertical axis represents the light intensities of the detection light beams 54a and 54b. FIG. 7A illustrates a case where the deviation between the oscillation of the first mirror 14 and the emission timings of the image light beams 52a and 52b is small, and FIG. 7B illustrate a case where the deviation is large.

As described in FIG. 1, the second region 16b of the second mirror 16 is formed so as to have a reflecting surface having a width narrower than the width of the detection light beam 54 in the direction corresponding to the main scanning direction. Accordingly, the range of the detection light beam 54 reflected by the second region 16b of the second mirror 16 is limited, and as illustrated in FIG. 7A and FIG. 7B, the range of the detection light beam 54 that can be detected by the light detector 18 (a detectable range 18a) is narrow in the direction corresponding to the main scanning direction. In this case, when the deviation between the oscillation of the first mirror 14 and the emission timings of the image light beams 52a and 52b is small, since the detection light beams 54 are set so as to be positioned on the same line in the subscanning direction as illustrated in FIG. 2, the light intensities of the detection light beams 54a and 54b in the detectable range 18a are relatively large as illustrated in FIG. 7A. Thus, the sum of the values of integral of the light intensities of the detection light beams 54a and 54b detected by the light detector 18 for the predetermined period is relatively large. In this case, as illustrated in FIG. 4A, an image with good image quality is projected onto the retina 72.

On the other hand, when the deviation between the oscillation of the first mirror 14 and the emission timings of the image light beams 52a and 52b is large, since the detection light beams 54 are not positioned on the same line in the subscanning direction, the light intensities of the detection light beams 54a and 54b in the detectable range 18a are relatively small as illustrated in FIG. 7B. Thus, the sum of the values of integral of the light intensities of the detection light beams 54a and 54b detected by the light detector 18 for the predetermined period is relatively small. In this case, the quality of an image projected onto the retina 72 deteriorates as illustrated in FIG. 4B.

The above fact reveals that it can be determined that the deviation between the oscillation of the first mirror 14 and the emission timings of the image light beams 52a and 52b is within the allowable range when the sum of the values of integral of the light intensities of the detection light beams 54a and 54b detected by the light detector 18 for the predetermined period is equal to or greater than a predetermined value. The predetermined value is a threshold value that divides the image quality of an image projected onto the retina 72 into good or bad, and is preliminarily stored in a storage unit not illustrated. For example, as the predetermined value, the maximum value of the sum of the values of integral of the light intensities of the detection light beams 54a and 54b possibly detected by the light detector 18 for the predetermined period, a value between values less than the maximum value by approximately 5%, or a value between values less than the maximum value by approximately 10% may be used.

Referring back to FIG. 6, when the deviation between the oscillation of the first mirror 14 and the emission timings of the image light beams 52*a* and 52*b* exceeds the allowable range (step S24: No), the process moves to step S26, and the controller 20 conducts adjustment between the oscillation of the first mirror 14 and the emission timings of the image light beams 52*a* and 52*b*.

Figure 8:
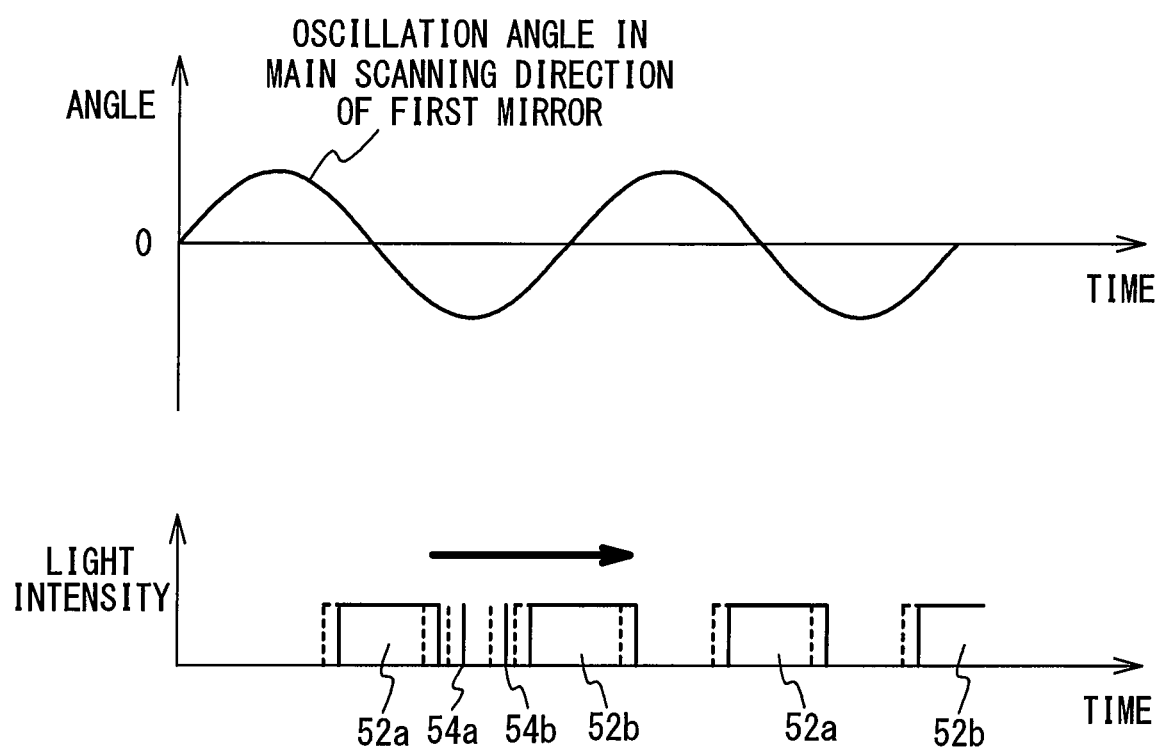
FIG. 8 is a timing chart illustrating emission timings of the image light beam and the detection light beam with respect to the oscillation of the first mirror before and after adjustment.

Here, with reference to FIG. 8, the adjustment between the oscillation of the first mirror 14 and the emission timings of the image light beams 52*a* and 52*b* will be described. FIG. 8 is a timing chart illustrating emission timings of the image light beams 52*a* and 52*b* and the detection light beams 54*a* and 54*b* with respect to the oscillation of the first mirror 14 before and after the adjustment. In FIG. 8, the emission timings before the adjustment are indicated by dashed lines, and the emission timings after the adjustment are indicated by solid lines.

As illustrated in FIG. 8, the controller 20 shifts the emission timings of all the image light beams 52*a* and 52*b* and the detection light beams 54*a* and 54*b* with respect to the oscillation in the main scanning direction of the first mirror 14 so that the sum of the values of integral of the light intensities of the detection light beams 54*a* and 54*b* in the predetermined period is not less than the predetermined value. For example, the controller 20 shifts the emission timings of all the image light beams 52*a* and 52*b* and the detection light beams 54*a* and 54*b* in increments of one pixel. The controller 20 also stores the shift amount of the emission timings of all the image light beams 52*a* and 52*b* and the detection light beams 54*a* and 54*b* in a storage unit not illustrated. A table that relates the difference between the sum of the values of integral of the light intensities of the detection light beams 54*a* and 54*b* and the predetermined value to the shift amount of the emission timings may be preliminarily stored in a storage unit not illustrated, and the controller 20 may determine the shift amount of the emission timings using this table.

After conducting the adjustment between the oscillation of the first mirror 14 and the emission timings of the image light beams 52*a* and 52*b*, the controller 20 moves to step S28. When the deviation between the oscillation of the first mirror 14 and the emission timings of the image light beams 52*a* and 52*b* is within the allowable range at step S24, the controller 20 also moves to step S28.

At step S28, the controller 20 repeatedly emits the image light beam 52*a* in the going path and the image light beam 52*b* in the return path until the projection of an image of one frame ends.

After the projection of the image of one frame is ended, when there is a next frame (step S30: Yes), the process returns to step S10 in FIG. 5, and the controller 20 starts the emission of the image light beam 52*a* in the next frame based on the oscillation angle of the first mirror 14 and the shift amount of the emission timing stored in the storage unit. Thereafter, step S12 through step S28 are executed. On the other hand, when there is no next frame (step S30: No), the processes of FIG. 5 and FIG. 6 are ended.

The controller 20 shifts the emission timings of all the image light beams 52*a* and 52*b* and the detection light beams 54*a* and 54*b* in the direction opposite to that of the previous time at step S26 when the sum of the values of integral of the light intensities of the detection light beams 54*a* and 54*b* obtained at step S24 for the next frame is less than the sum of the values of integral stored in the storage unit.

Figure 9A:
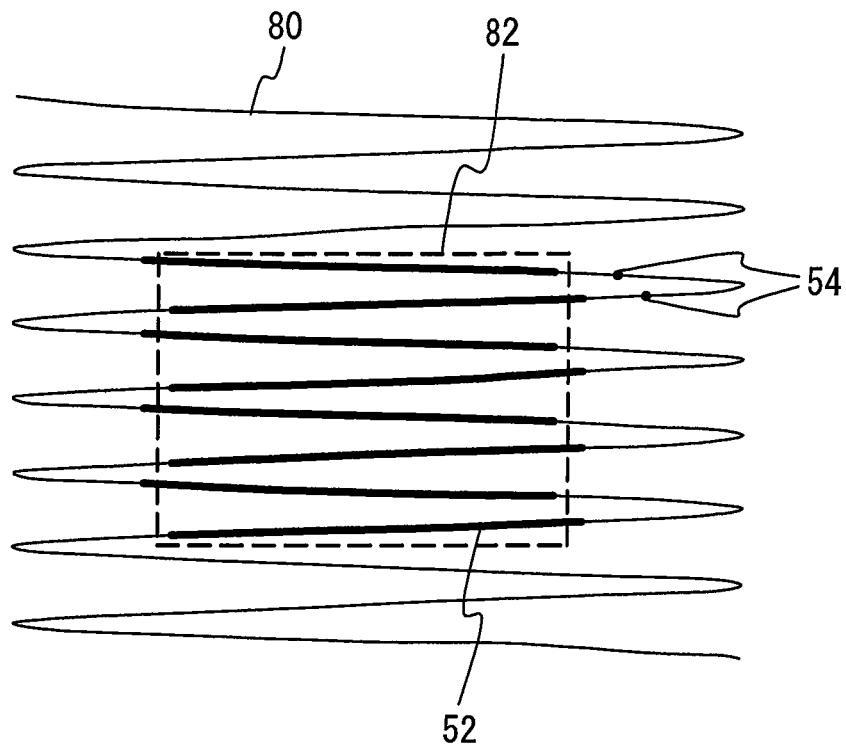
FIG. 9A is a diagram for describing emission timings of the image light beam and the detection light beam with respect to the oscillation of the first mirror before adjustment.
Figure 9B:
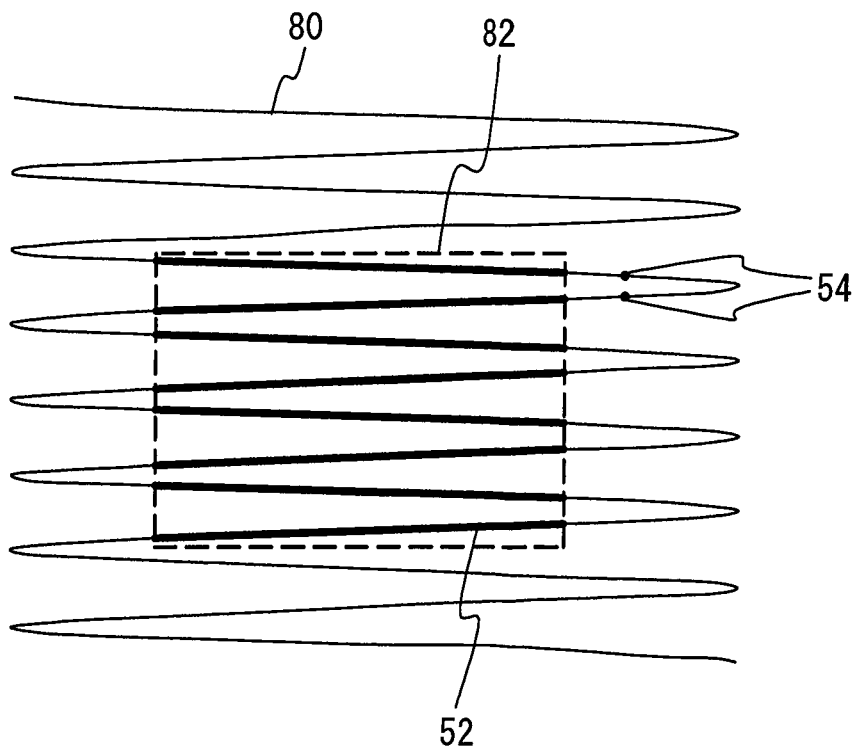
FIG. 9B is a diagram for describing emission timings of the image light beam and the detection light beam with respect to the oscillation of the first mirror after the adjustment.

FIG. 9A is a diagram for describing emission timings of the image light beam 52 and the detection light beam 54 with respect to the oscillation of the first mirror 14 before the adjustment, and FIG. 9B is a diagram for describing emission timings of the image light beam 52 and the detection light beam 54 with respect to the oscillation of the first mirror 14 after the adjustment. Repetitive execution of the controls of FIG. 5 and FIG. 6 reduces the deviation of the emission timing of the image light beam 52 with respect to the oscillation of the first mirror 14 as illustrated in FIG. 9B even when the emission timing of the image light beam 52 with respect to the oscillation of the first mirror 14 deviates as illustrated in FIG. 9A. Accordingly, an image with good image quality illustrated in FIG. 4A can be projected.

As described above, in the first embodiment, in the reciprocal oscillation in the main scanning direction of the first mirror 14, the detection light beam 54 enters the first mirror 14 at time corresponding to the outside of the image range 82. The controller 20 adjusts the first mirror 14 and the emission timing of the image light beam 52 based on the detection result of the detection light beam 54 by the light detector 18. This configuration reduces the deviation between the oscillation of the first mirror 14 and the emission timing of the image light beam 52 as described in FIG. 8 through FIG. 9B, and thus, the deterioration in quality of the image projected onto the retina 72 is reduced. Additionally, the second mirror 16 includes the second region 16*b* that reflects the detection light beam 54 in the direction different from the direction in which the image light beam 52 is reflected in addition to the first region 16*a* that reflects the image light beam 52 to the retina 72, and the detection light beam 54 reflected by the second region 16*b* is detected by the light detector 18. This configuration inhibits the increase in the number of components, thereby inhibiting the increase in device size.

Figure 10:
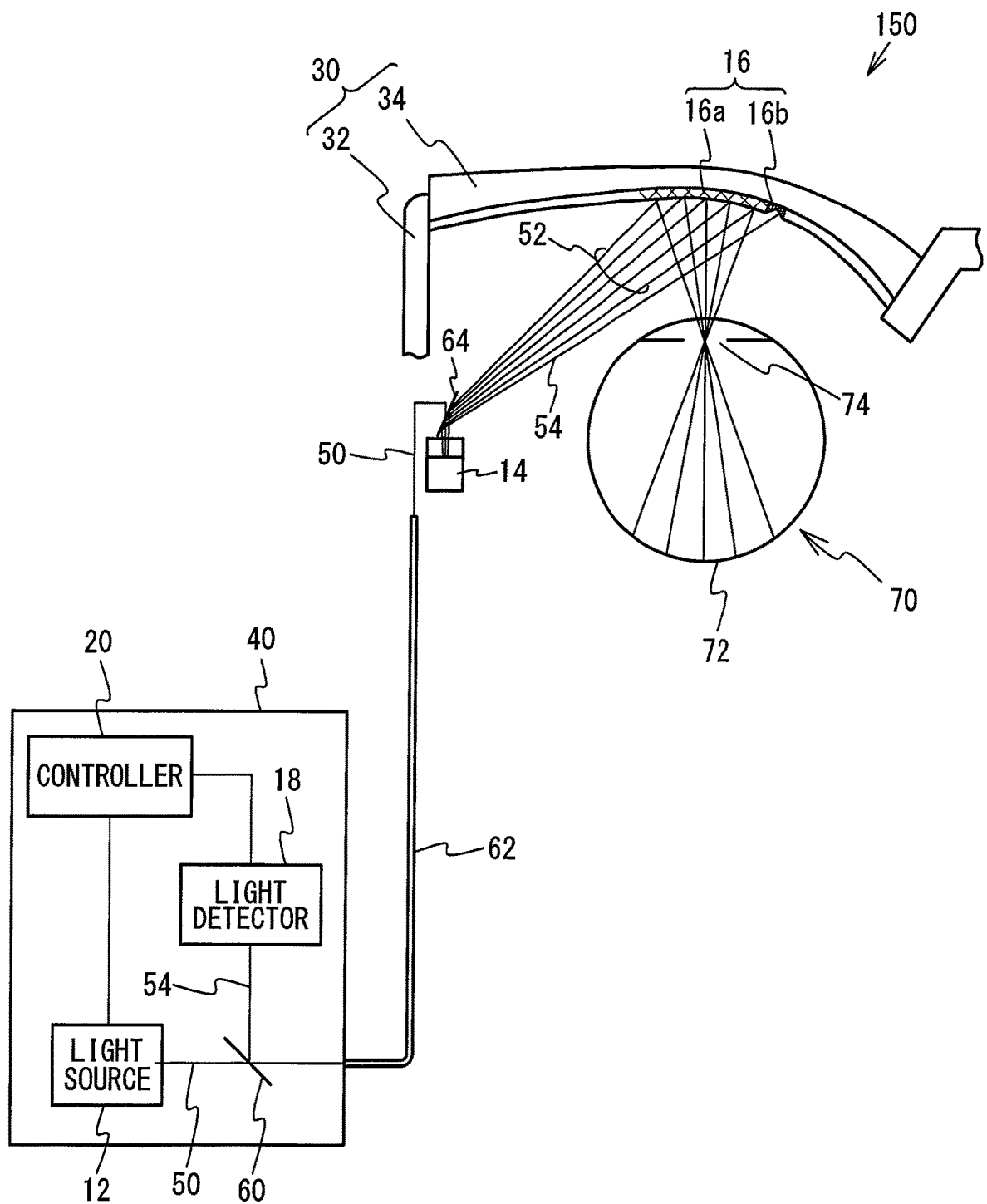
FIG. 10 illustrates an image projection device in accordance with a first variation of the first embodiment as viewed from above.

Moreover, in the first embodiment, the second region 16*b* of the second mirror 16 is located next to the first region 16*a* in the direction corresponding to the main scanning direction, and has a protruding shape with respect to the first region 16*a*. Accordingly, the second mirror 16 can reflect the detection light beam 54 toward the side at which the first mirror 14 and the like are located. Thus, the light detector 18 detecting the detection light beam 54 can be arranged together with other components. For example, by configuring the second mirror 16 to reflect the detection light beam 54 so that the detection light beam 54 travels back along the light path identical to the light path along which the detection light beam 54 traveled, the light detector 18 can be provided to the external device 40. The first embodiment describes a case where the second region 16*b* of the second mirror 16 protrudes with respect to the first region 16*a* as an example, but the second region 16*b* may be recessed with respect to the first region 16*a* as in an image projection device 150 in accordance with a first variation of the first embodiment illustrated in FIG. 10.

In the first embodiment, the detection light beam 54 is emitted within the period shorter than the period from the end of the image range 82 to the turn-round of the oscillation in the main scanning direction of the first mirror 14 without being temporally continuous with the image light beam 52. The second region 16*b* of the second mirror 16 has a reflecting surface narrower than the width of the detection light beam 54 in the direction corresponding to the main scanning direction. This configuration easily enables to detect the detection light beam 54 reflected by the second region 16*b* of the second mirror 16 by the light detector 18 and adjust the oscillation of the first mirror 14 and the emission timing of the image light beam 52 based on the detection result. The first embodiment describes a case where the second region 16b of the second mirror 16 has a reflecting surface narrower than the width of the detection light beam 54 in the direction corresponding to the main scanning direction as an example, but does not intend to suggest any limitation, and the second region 16b of the second mirror 16 may have a reflecting surface not larger than the width of the detection light beam 54.

In the first embodiment, in each of the going path and the return path of the reciprocal oscillation in the main scanning direction of the first mirror 14, the detection light beams 54a and 54b are emitted so that the detection light beam 54a in the going path is temporally discontinuous with the detection light beam 54b in the return path. The controller 20 adjusts the oscillation of the first mirror 14 and the emission timing of the image light beam 52 based on the detection result of the detection light beam 54a emitted in the going path and the detection result of the detection light beam 54b emitted in the return path. By using the detection light beams 54a and 54b respectively emitted in the going path and the return path, the oscillation of the first mirror 14 and the emission timing of the image light beam 52 are more precisely adjusted.

In the first embodiment, the first mirror 14 and the second mirror 16 are located in the spectacle type frame 30, and the light detector 18 is included in the external device 40. This configuration reduces the number of components equipped to the spectacle type frame 30, thereby inhibiting increase in size.

The first embodiment describes a case where the oscillation of the first mirror 14 and the emission timing of the image light beam 52 are adjusted by correcting the emission timing of the image light beam 52 so that the light intensity of the detection light beam 54 detected by the light detector 18 increases, but does not intend to suggest any limitation. For example, the oscillation of the first mirror 14 and the emission timing of the image light beam 52 may be adjusted based on the time at which the detection light beam 54 was detected by the light detector 18. For example, a freely-selected point in the oscillation angle in the main scanning direction of the first mirror 14 is defined as an original time. When the oscillation of the first mirror 14 and the emission timing of the image light beam 52 do not deviate from each other, the time from the original time to the time at which the light detector 18 detects the detection light beam 54 is preliminarily stored as the criterion time interval in a storage unit not illustrated. Then, the time interval from the original time to the time at which the light detector 18 actually detected the detection light beam 54 is compared with the criterion time interval, and the oscillation of the first mirror 14 and the emission timing of the image light beam 52 may be adjusted by correcting the emission timing of the image light beam 52 so that the difference therebetween decreases. When the oscillation of the first mirror 14 and the emission timing of the image light beam 52 are adjusted based on the magnitude of the light intensity of the detection light beam 54, the adjustment may be conducted based on the sum of the values of integral of the light intensity of the detection light beam 54 in the predetermined period or based on, for example, the maximum value of the light intensity of the detection light beam 54.

In the first embodiment, the detection light beam 54 may enter the first mirror 14 in only one of the going path and the return path of the reciprocal oscillation in the main scanning direction of the first mirror 14, and the oscillation of the first mirror 14 and the emission timing of the image light beam 52 may be adjusted based on the detection result of this detection light beam 54.

In the first embodiment, a plurality of pairs of the detection light beams 54a and 54b, where the detection light beams 54a and 54b form one pair, may enter the first mirror 14, and the oscillation of the first mirror 14 and the emission timing of the image light beam 52 may be adjusted based on the detection results of the plurality of pairs of the detection light beams 54a and 54b. In this case, the oscillation of the first mirror 14 and the emission timing of the image light beam 52 may be adjusted based on the average of the detection results of the plurality of pairs of the detection light beams 54a and 54b.

The first embodiment describes a case where the oscillation of the first mirror 14 and the emission timing of the image light beam 52 are adjusted in the process of projecting an image of one frame as described at steps S24 and S26 in FIG. 6 as an example, but the oscillation of the first mirror 14 and the emission timing of the image light beam 52 may be adjusted after the projection of the image of one frame ends. Alternatively, the oscillation of the first mirror 14 and the emission timing of the image light beam 52 may be adjusted every time when an image of one frame is projected, or the oscillation of the first mirror 14 and the emission timing of the image light beam 52 may be adjusted once per projections of images of multiple frames.

Second Embodiment

Figure 11:
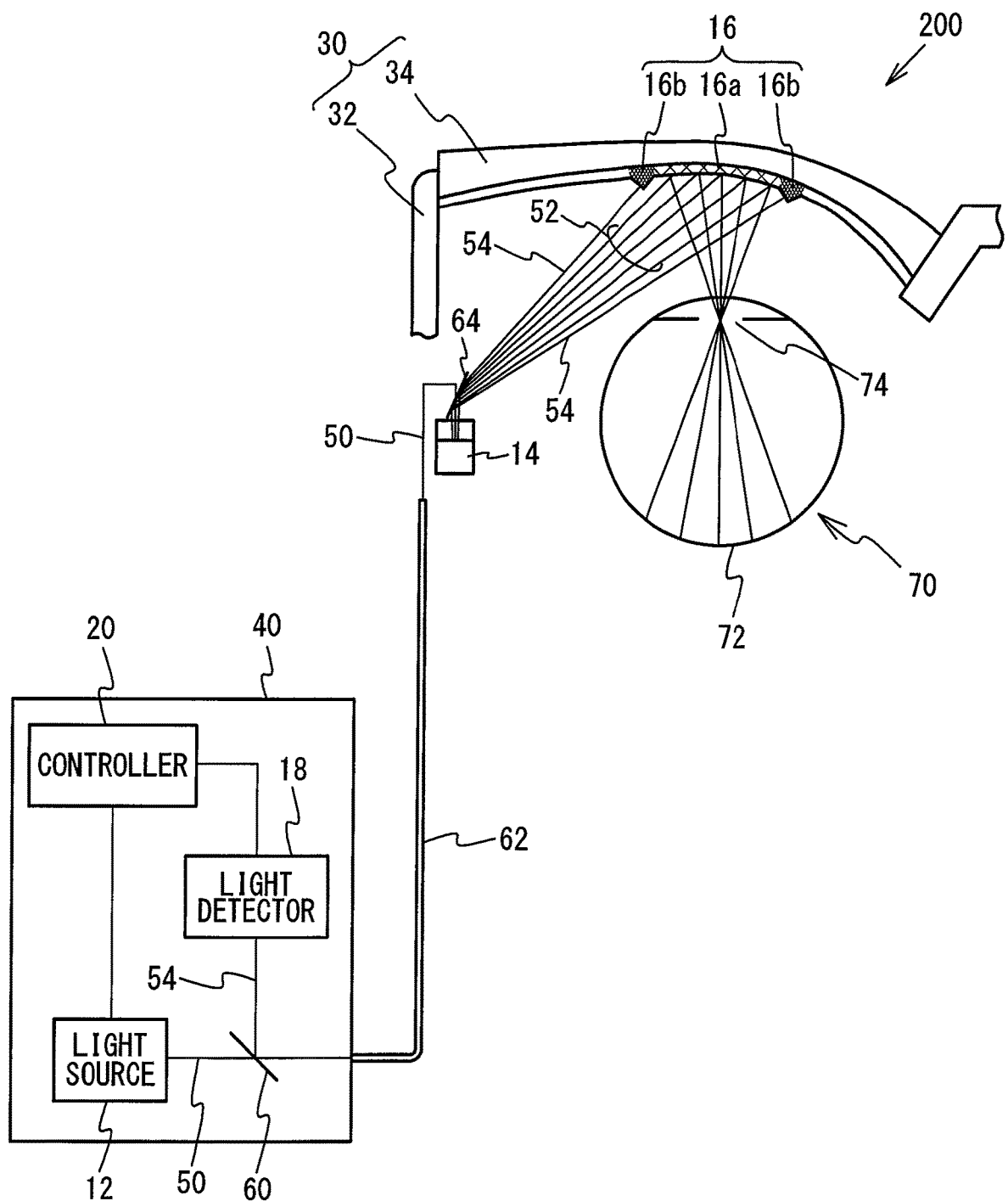
FIG. 11 illustrates an image projection device in accordance with a second embodiment as viewed from above.

FIG. 11 illustrates an image projection device 200 in accordance with a second embodiment as viewed from above. In the image projection device 200 of the second embodiment, as illustrated in FIG. 11, in the second mirror 16, the second regions 16b are located at both sides of the first region 16a in the direction corresponding to the main scanning direction. The detection light beam 54 emitted from the light source 12 enter both the two second regions 16b. Other structures are the same as or similar to those of the first embodiment, and the description thereof is thus omitted.

Figure 12:
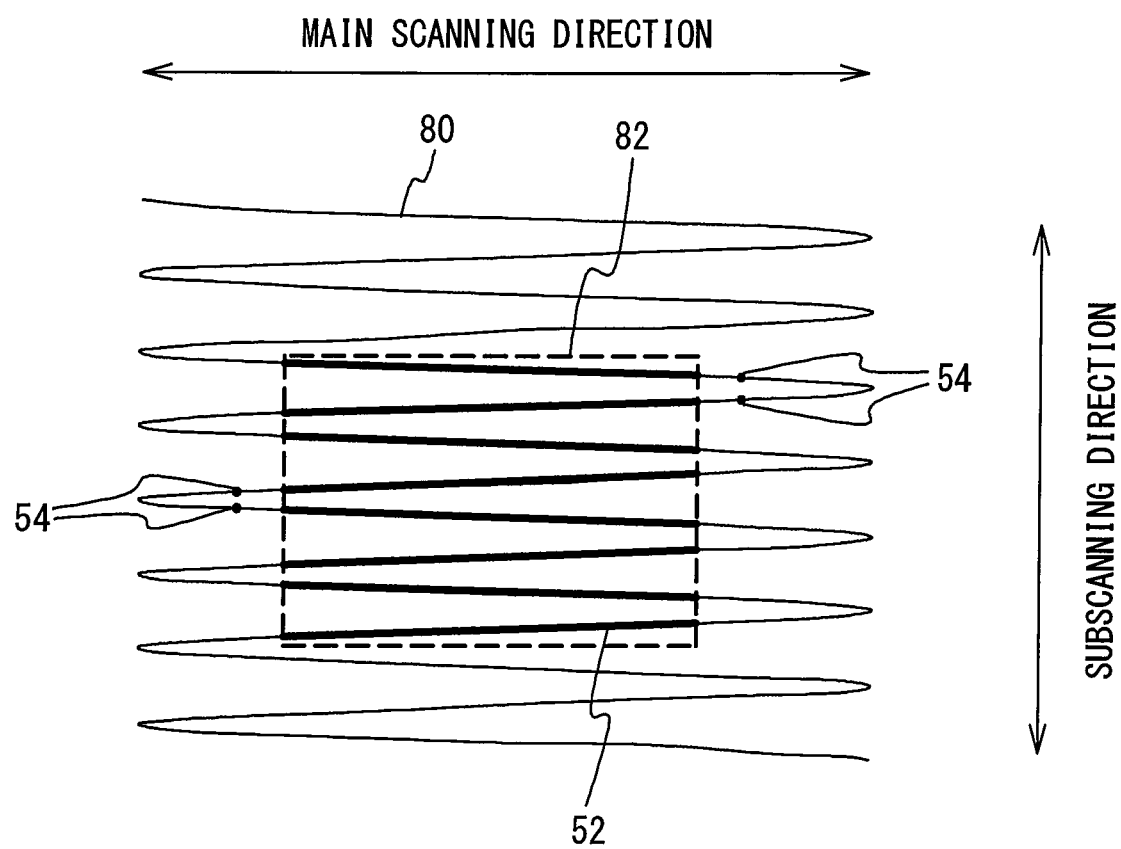
FIG. 12 is a diagram for describing emission timings of the image light beam and the detection light beam with respect to the oscillation of the first mirror in the second embodiment.

FIG. 12 is a diagram for describing emission timings of the image light beam 52 and the detection light beam 54 with respect to the oscillation of the first mirror 14. As illustrated in FIG. 12, in the reciprocal oscillation in the main scanning direction of the first mirror 14, the detection light beam 54 is emitted from the light source 12 at the time (timing) when the oscillation of the first mirror 14 is at each side of the image range 82. Other structures are the same as or similar to those of the first embodiment, and the description thereof is thus omitted.

The controller 20 of the image projection device 200 of the second embodiment adjusts the oscillation of the first mirror 14 and the emission timing of the image light beam 52 based on the detection result of the detection light beam 54 emitted at each side of the image range 82. The adjustment method is the same as or similar to the method described in the first embodiment, and the description thereof is thus omitted.

In the second embodiment, the detection light beam 54 is emitted from the light source 12 to the first mirror 14 at each side of the image range 82. The controller 20 adjusts the oscillation of the first mirror 14 and the emission timing of the image light beam 52 based on the detection result of the detection light beam 54 emitted at each side of the image range 82. As described above, use of the detection light beam 54 emitted at each side of the image range 82 enables to more precisely adjust the oscillation of the first mirror 14 and the emission timing of the image light beam 52.

In the second embodiment, the oscillation of the first mirror 14 and the emission timing of the image light beam 52 may be adjusted based on the average of the detection result of the detection light beam 54 emitted at one side of the image range 82 and the detection result of the detection light beam 54 emitted at the other side of the image range 82.

Third Embodiment

Figure 13:
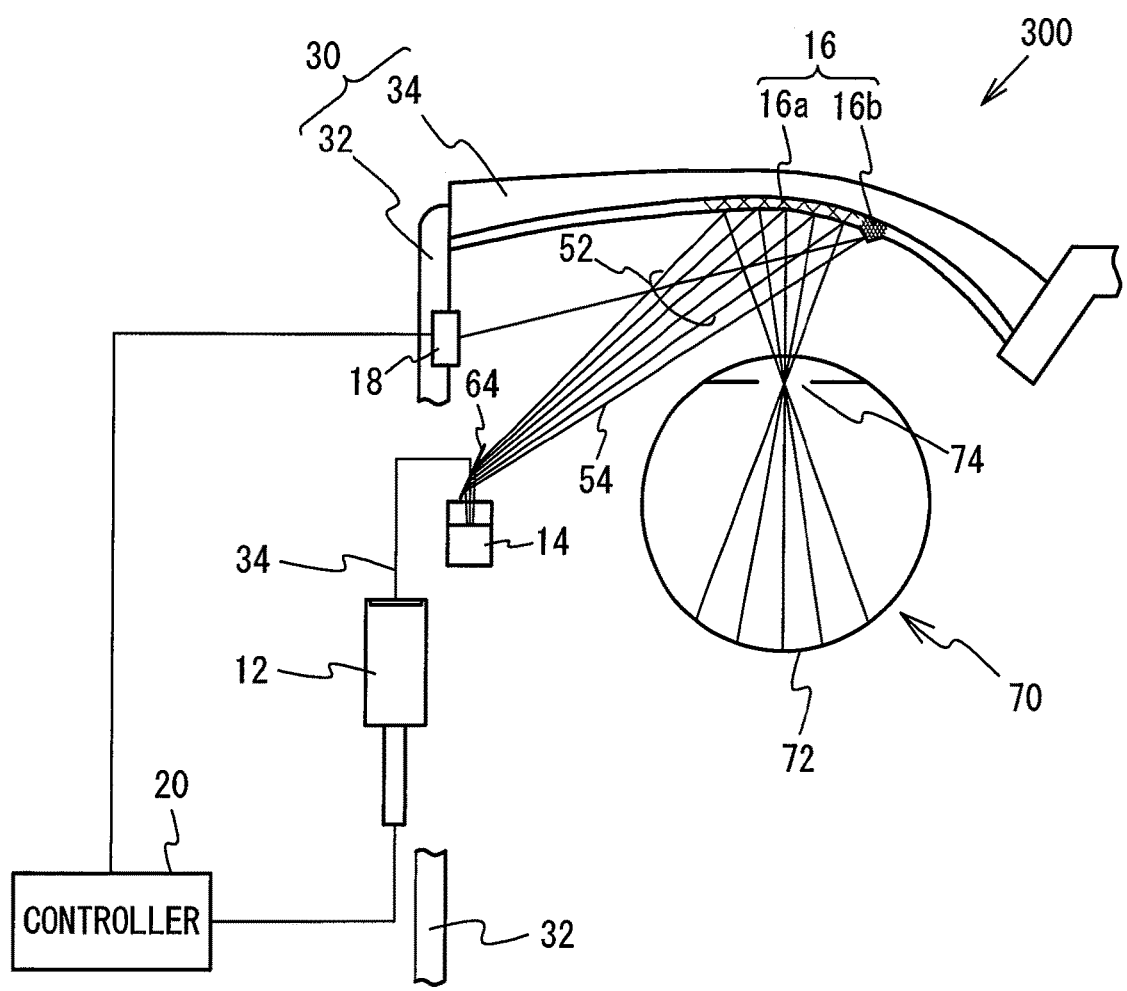
FIG. 13 illustrates an image projection device in accordance with a third embodiment as viewed from above.

FIG. 13 illustrates an image projection device 300 in accordance with a third embodiment as viewed from above. In the image projection device 300 of the third embodiment, as illustrated in FIG. 13, the light source 12 and the light detector 18 are located in the temple 32 of the spectacle type frame 30. The detection light beam 54 is reflected by the second region 16b of the second mirror 16 toward the light detector 18 located in the temple 32 of the spectacle type frame 30. Other structures are the same as or similar to those of the first embodiment, and the description thereof is thus omitted.

In the third embodiment, the first mirror 14, the second mirror 16, and the light detector 18 are located in the spectacle type frame 30. This configuration enables to easily achieve the structure in which the detection light beam 54 reflected by the second mirror 16 is detected by the light detector 18.

In the third embodiment, as in the first embodiment and the second embodiment, the light source 12 may be included in the external device 40. In the first embodiment and the second embodiment, as in the third embodiment, the light source 12 may be located in the temple 32 of the spectacle type frame 30.

In the first through third embodiments, when the detection light beam 54 entering the second region 16b of the second mirror 16 is a diffusion light, the second region 16b may be structured to have a reflecting surface with a protruding shape. This configuration allows the detection light beam 54 to be collected to the optical fiber 62 in the first embodiment and the second embodiment, and allows the detection light beam 54 to be collected to the light detector 18 in the third embodiment.

Fourth Embodiment

Figure 14:
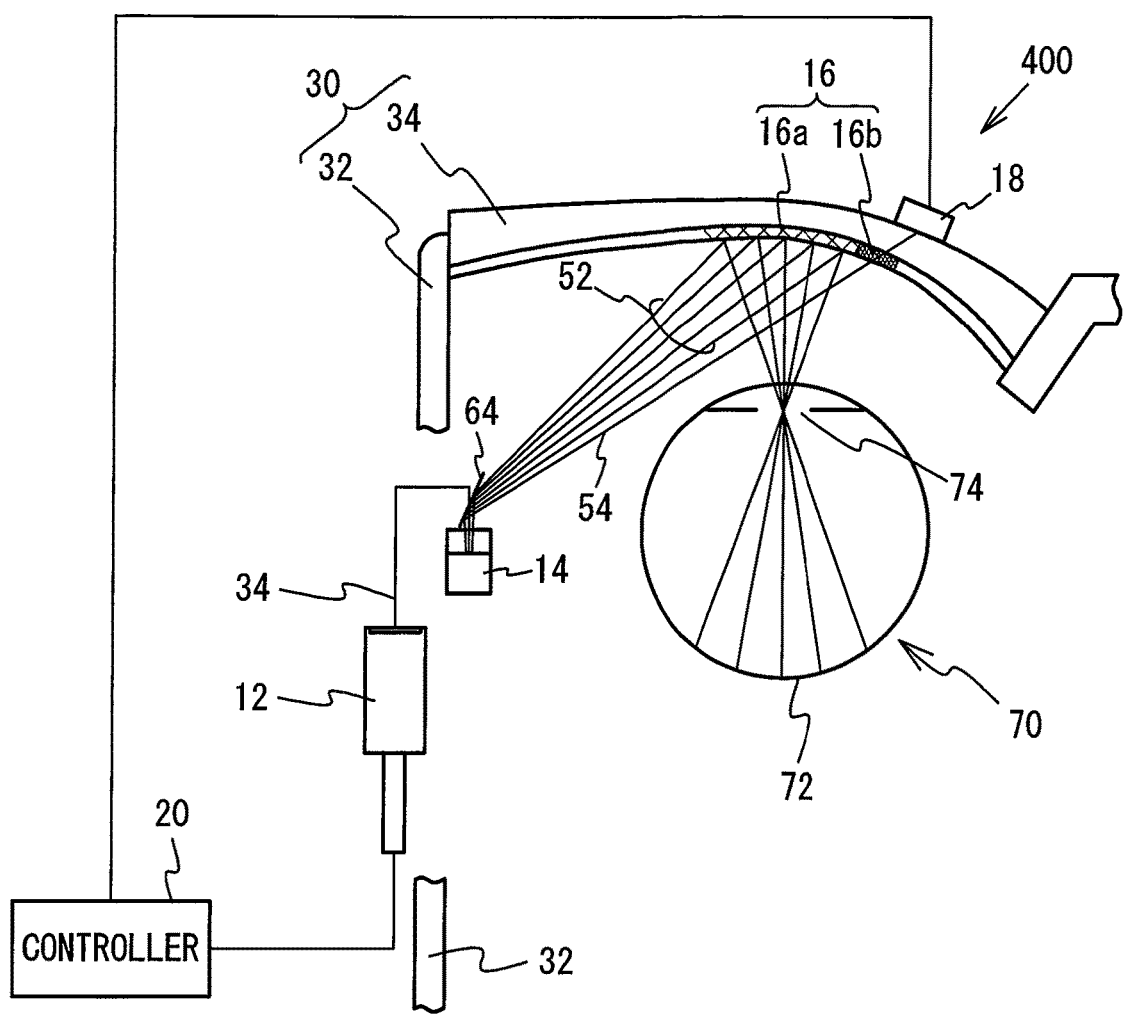
FIG. 14 illustrates an image projection device in accordance with a fourth embodiment as viewed from above.

FIG. 14 illustrates an image projection device 400 in accordance with a fourth embodiment as viewed from above. In the image projection device 400 of the fourth embodiment, as illustrated in FIG. 14, the light source 12 is located in the temple 32 of the spectacle type frame 30. The light detector 18 is located on the opposite surface of the lens 34 of the spectacle type frame 30 from the eye ball 70. In the second mirror 16, the second region 16b where the detection light beam 54 is incident has a shape that is flat with respect to the first region 16a, where the image light beam 52 is incident, and optically discontinuous with the first region 16a. This structure inhibits the detection light beam 54 from being projected onto the retina 72 of the eye ball 70 together with the image light beam 52. Since the second mirror 16 is a half mirror, a part of the detection light beam 54 passes through the second mirror 16. The light detector 18 detects the detection light beam 54 passing through the second mirror 16. The dimensions of the light receiving region of the light detector 18 are not greater than the width of the detection light beam 54. Other structures are the same as or similar to those of the first embodiment, and the description thereof is thus omitted.

As described in the fourth embodiment, the light detector 18 may be located on the opposite surface of the lens 34 of the spectacle type frame 30 from the eye ball 70. Since the second mirror 16 is a half mirror, the light detector 18 can detect the detection light beam 54 passing through the second mirror 16. Since the light detector 18 has a light receiving region not larger than the width of the detection light beam 54, the oscillation of the first mirror 14 and the emission timing of the image light beam 52 can be easily adjusted.

In the fourth embodiment, as in the first embodiment and the second embodiment, the light source 12 may be included in the external device 40.

The first through fourth embodiments describe reciprocation scanning in which the image light beam 52 is scanned in the going path and the return path of the reciprocal oscillation in the main scanning direction of the first mirror 14 as an example, but one-way scanning in which the image light beam 52 is scanned in only one of the going path and the return path may be employed. The first through fourth embodiments use as an example of the light beam 50 emitted from the light source 12 a laser light having an efficiency advantage, but the light beam 50 is not limited to the laser light. The second mirror 16 is not limited to a mirror that splits the intensity of the reflected light and the transmitted light to 1:1.

Although the desirable embodiments of the present invention has been described in detail, the present invention is not limited to a certain embodiment, and it should be understood that the various change, substitutions, and alterations could be made hereto without departing from the spirit and scope of the invention.

The invention claimed is:

1. An image projection device comprising:
a first mirror that oscillates to scan an image light beam forming an image projected onto a retina of a user;
a light source that emits the image light beam to the first mirror and emits a detection light beam to the first mirror at a timing different from a timing when the image light beam is emitted;
a second mirror that has a first region and a second region, and scans neither the image light beam nor the detection light beam reflected by the first mirror, the first region reflecting the image light beam reflected by the first mirror to the retina of the user, the second region reflecting the detection light beam reflected by the first mirror in a direction different from a direction in which the image light beam is reflected;
a light detector that detects the detection light beam reflected by the second region of the second mirror; and
a controller that adjusts oscillation of the first mirror and an emission timing of the image light beam from the light source based on a detection result by the light detector.

2. An image projection device comprising:
a first mirror that oscillates in a main scanning direction beyond a range of an image projected onto a retina of a user to scan an image light beam in the main scanning direction, the image light beam forming the image;
a light source that emits the image light beam to the first mirror in a period corresponding to the range of the image and emits a detection light beam to the first mirror at time corresponding to an outside of the range of the image in reciprocal oscillation in the main scanning direction of the first mirror;

a second mirror that reflects the image light beam reflected by the first mirror to the retina of the user, and reflects the detection light beam reflected by the first mirror in a direction different from a direction in which the image light beam is reflected or transmits the detection light beam;

a light detector that detects the detection light beam reflected by the second mirror or the detection light beam passing through the second mirror; and a controller that adjusts oscillation of the first mirror and an emission timing of the image light beam from the light source so that a light intensity of the detection light beam detected by the light detector increases.

3. An image projection device comprising:

a first mirror that oscillates in a main scanning direction beyond a range of an image projected onto a retina of a user to scan an image light beam in the main scanning direction, the image light beam forming the image;

a light source that emits the image light beam to the first mirror in a period corresponding to the range of the image and emits a detection light beam to the first mirror at time corresponding to an outside of the range of the image in each of a going path and a return path of a reciprocal oscillation in the main scanning direction of the first mirror without making the detection light beam in the going path and the detection light beam in the return path temporally continuous with each other in the reciprocal oscillation;

a second mirror that reflects the image light beam reflected by the first mirror to the retina of the user, and reflects the detection light beam reflected by the first mirror in a direction different from a direction in which the image light beam is reflected or transmits the detection light beam;

a light detector that detects the detection light beam reflected by the second mirror or the detection light beam passing through the second mirror; and a controller that adjusts oscillation of the first mirror and an emission timing of the image light beam from the light source based on a detection result of the detection light beam emitted in the going path by the light detector and a detection result of the detection light beam emitted in the return path by the light detector.

4. The image projection device according to claim 2, wherein the light source emits the detection light beam at each side of the range of the image, and the controller adjusts the oscillation of the first mirror and the emission timing of the image light beam based on a detection result of the detection light beam emitted at the each side of the range of the image.

5. The image projection device according to claim 1, wherein in the second mirror, the second region is located next to the first region in a direction corresponding to the main scanning direction, and protrudes or is recessed with respect to the first region.

6. The image projection device according to claim 5, wherein the second region of the second mirror has a reflecting surface having a dimension not greater than a width of the detection light beam in the direction corresponding to the main scanning direction.

7. The image projection device according to claim 1, wherein the first mirror and the second mirror are provided to a spectacle type frame, and the light detector is provided to an external device different from the spectacle type frame.

8. The image projection device according to claim 1, wherein the first mirror, the second mirror, and the light detector are provided to a spectacle type frame.

9. The image projection device according to claim 2, wherein the light source emits the detection light beam within a period shorter than a period from an end of the range of the image to a turn-round of oscillation in the main scanning direction of the first mirror without making the detection light beam temporally continuous with the image light beam.

10. An image projection device comprising:

a first mirror that oscillates to scan an image light beam forming an image projected onto a retina of a user, a light source that emits the image light beam to the first mirror and emits a detection light beam to the first mirror at a timing different from a timing when the image light beam is emitted;

a second mirror that reflects the image light beam reflected by the first mirror to the retina of the user, and reflects the detection light beam reflected by the first mirror in a direction different from a direction in which the image light beam is reflected or transmits the detection light beam;

a light detector that detects the detection light beam reflected by the second mirror or the detection light beam passing through the second mirror; and a controller that adjusts oscillation of the first mirror and an emission timing of the image light beam from the light source so that a light intensity of the detection light beam detected by the light detector increases.

11. The image projection device according to claim 10, wherein the light detector detects the detection light beam passing through the second mirror, and has a light receiving region not larger than a width of the detection light beam.

* * * * *